May 8, 1934.  H. C. FLACK  1,958,300
CUTTING DEVICE
Filed Aug. 15, 1933   3 Sheets-Sheet 1
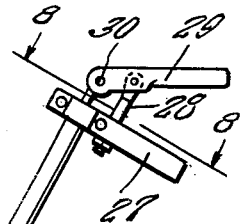
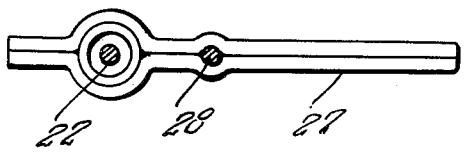
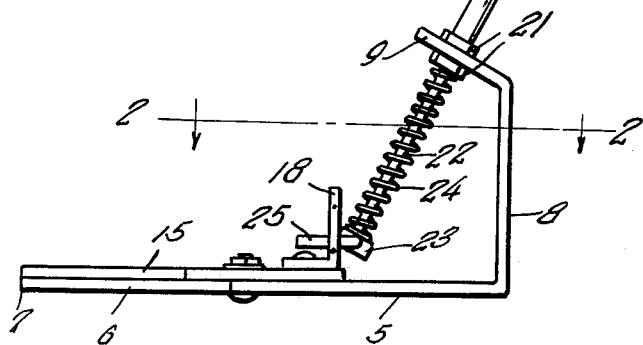
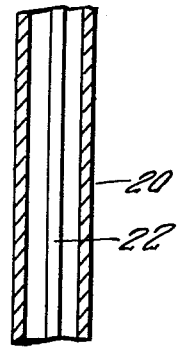
Inventor
H. C. Flack
By Clarence A. O'Brien
Attorney

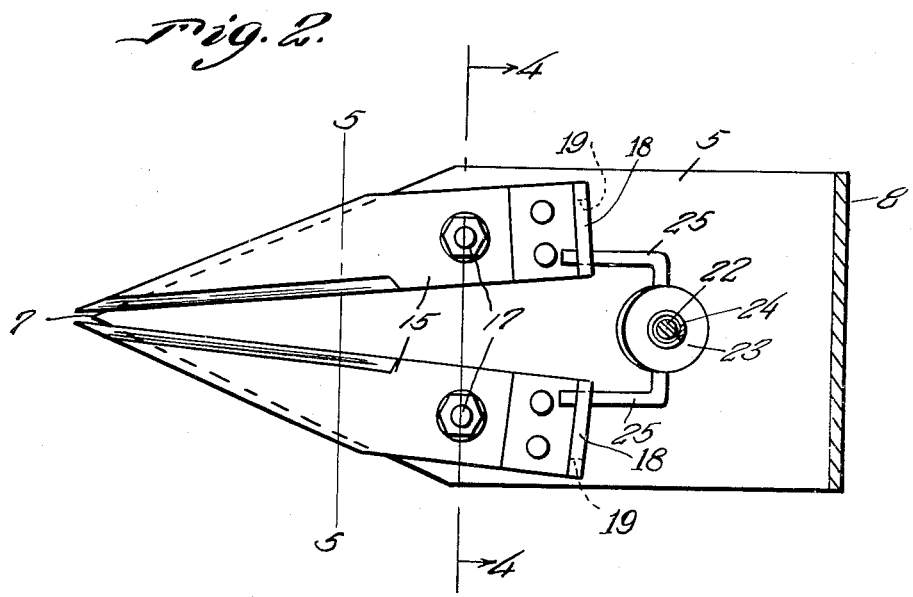
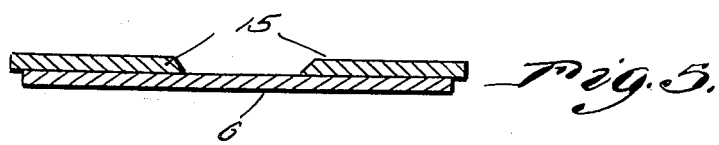
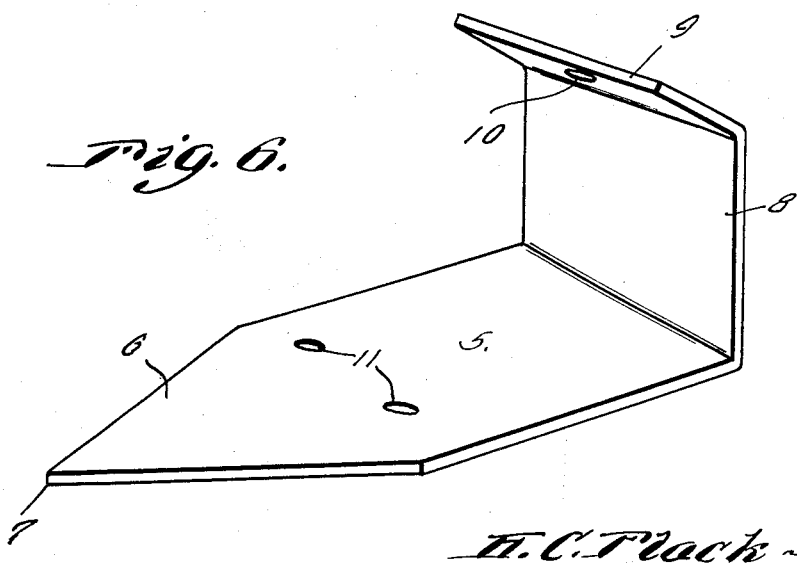

May 8, 1934.                H. C. FLACK                1,958,300
                          CUTTING DEVICE
                       Filed Aug. 15, 1933        3 Sheets-Sheet 3
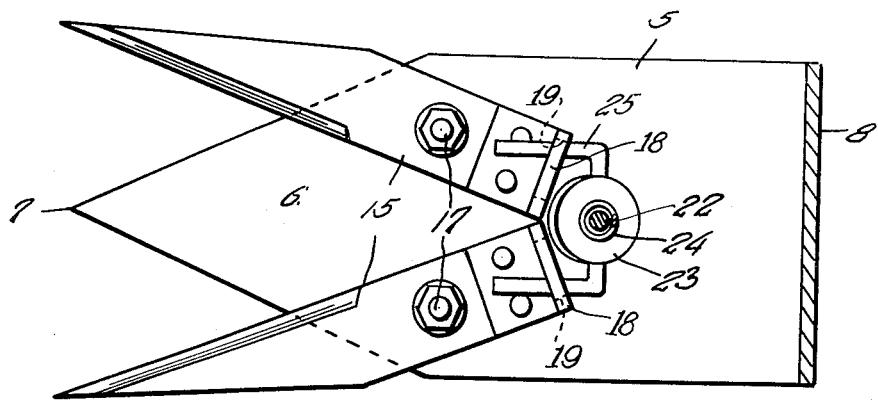
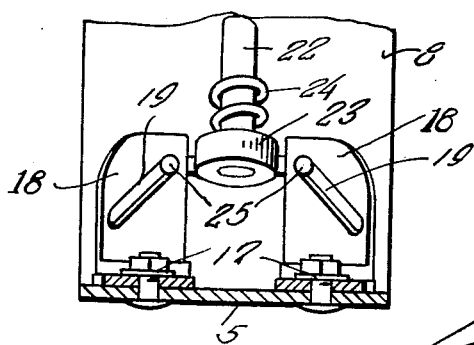
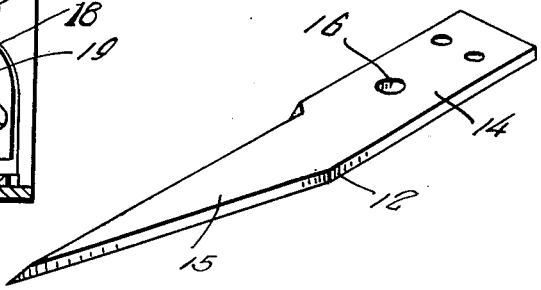
Inventor
H. C. Flack
By Clarence A. O'Brien
Attorney Patented May 8, 1934

1,958,300

UNITED STATES PATENT OFFICE 1,958,300

CUTTING DEVICE

Harry C. Flack, St. Louis, Mo.

Application August 15, 1933, Serial No. 685,290

1 Claim. (Cl. 30—11)

The present invention relates to a cutting device and is more particularly designed for use as shears for cutting grass.

An important object of the invention resides in the provision of a cutting device having a base member and a projecting fixed blade with a pair of movable blades having separate spaced pivotal mountings on the base member with the blades moving toward or away from the cutting edges of the fixed blade so that a double cutting action may be had.

Another important object of the invention resides in the provision of novel means for operating the movable blades.

A further important object of the invention resides in the provision of a cutting device of this nature which is comparatively simple in its construction, easy to manipulate, thoroughly efficient and reliable in use and operation, inexpensive to manufacture, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a side elevation of the cutting device embodying the features of my invention.

Figure 2 is a horizontal section therethrough taken substantially on the line 2—2 of Figure 1.

Figure 3 is a similar section but showing the movable blades in open position.

Figure 4 is a vertical transverse section taken substantially on the line 4—4 of Figure 2.

Figure 5 is a vertical transverse section taken substantially on the line 5—5 of Figure 2.

Figure 6 is a perspective view of the base member.

Figure 7 is a perspective view of one of the movable blades.

Figure 8 is a detail section taken substantially on the line 8—8 of Figure 1.

Figure 9 is a sectional detail of the connecting rod in its tubular housing.

Referring to the drawings in detail it will be seen that numeral 5 denotes a base member having a fixed blade 6 projecting from one end thereof and of a triangular formation with a smaller end or apex 7 forming the outer or terminus of the fixed blade. Rising from the other end of the base 5 is an extension 8 merging into an oblique extension 9 overhanging the base 5 and having an opening 10. Openings 11, 11 are provided in the base 5 adjacent the fixed blade 6.

A pair of movable blades 12 have body portions 14 and blade portions 15. Openings 16 are provided in the intermediate portions of the bodies 14. Bolts 17 extend through the openings 11 and 16 to rockably mount the movable blades with respect to the fixed blade 6. Angular members 18 are mounted on the ends of the bodies 14 remote from the blade portions 15 and have diagonal slots 19 therein which converge upwardly toward each other as shown in Figure 4.

An elongated tube 20 has its lower end fixed in the opening 10 by suitable nuts 21 or like means. An elongated rod 22 is slidable through the tube 20. A head 23 is formed on the lower end of the rod 22. A spring 24 is mounted about the lower portion of the rod 22 impinging against the head 23 and the lower nut 21. Angular rods 25 project from the head into the slots 19. Therefore when the rod 22 is reciprocated through the tube 20 the movable blades are oscillated so as to cooperate with the edges of the fixed blade as will be quite apparent.

To operate the rod 22 I mount a bracket 27 on the upper end of the tube 21 and form the bracket 27 in two sections having portions clamped about the upper end of the tube as more clearly shown in Figure 8 and also holding a stem 28 rising from the bracket and on which an intermediate portion of a lever 29 is rockable. One end of the lever has a pivotal connection 30 with the rod. The rod is sufficiently flexible and is sufficiently smaller than the tube 20 to take care of the arc described by the lever. Obviously the hand of the operator may grasp both the bracket arm 27 and the lever 29 and by closing the hand the rod 22 is pulled upwardly and actuates the movable blade to swing inwardly and cut and then by releasing the grip the spring 24 pushes the rod downwardly and opens the movable blade.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A cutting device of the class described comprising a base having its front end pointed to form a fixed blade, the rear end of the blade being bent upwardly at right angles and the upper end of said bent-up portion being bent to provide an upwardly and forwardly sloping portion, having a hole therein, a tube having its lower end passing through said hole, means for holding said end of the tube in the hole, a rod passing through the tube, a head on the lower end of the rod, a pair of oppositely arranged forwardly extending members attached to the head, a pair of movable blades resting on the base, one on each side of the longitudinal center of the base, means for pivoting the said blades intermediate their ends to the base, the cutting edges of said blades cooperating with the fixed blade for cutting material, each movable blade having an upstanding part at its rear end provided with an upwardly and inwardly sloping slot into which slots extend the forwardly extending parts of the members carried by the head, a spring on the rod having one end engaging the head and the other end a part of the means which fastens the tube to the forwardly sloping part of the base, a clamp connected with the upper end of the tube, a post carried by an intermediate part of the clamp, said clamp being elongated to provide a handle, and a lever pivoted to the post intermediate its ends and having its forward end pivoted to the upper end of the rod.

HARRY C. FLACK.